(12) United States Patent
Gelinotte et al.

(10) Patent No.: US 8,783,688 B2
(45) Date of Patent: *Jul. 22, 2014

(54) GAMING TABLES HAVING A TABLE TOP EXCHANGEABLE INSERT

(71) Applicant: Gaming Partners International Corporation, Las Vegas, NV (US)

(72) Inventors: Emmanuel Gelinotte, Savigny les Beaune (FR); Francisco Javier Moreno, San Luis, AZ (US); Gregory Gronau, Las Vegas, NV (US)

(73) Assignee: Gaming Partners International USA, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/733,635

(22) Filed: Jan. 3, 2013

(65) Prior Publication Data

US 2013/0207345 A1 Aug. 15, 2013

Related U.S. Application Data

(63) Continuation-in-part of application No. 13/032,211, filed on Feb. 22, 2011, now Pat. No. 8,528,909.

(60) Provisional application No. 61/306,526, filed on Feb. 21, 2010.

(51) Int. Cl.
*A63F 1/00* (2006.01)
(52) U.S. Cl.
USPC ............. 273/309; 273/284; 273/274; 463/46
(58) Field of Classification Search
USPC ............................. 273/309, 274, 284; 463/46
See application file for complete search history.

(56) References Cited

U.S. PATENT DOCUMENTS

| 4,813,675 | A | * | 3/1989 | Greenwood | 463/46 |
| 5,441,279 | A | * | 8/1995 | Messina | 273/309 |
| 5,735,742 | A | | 4/1998 | French | |
| 6,210,267 | B1 | | 4/2001 | Long et al. | |
| 6,688,984 | B2 | | 2/2004 | Cole | |
| 7,575,240 | B1 | * | 8/2009 | Voden | 273/309 |
| 7,719,424 | B2 | | 5/2010 | Steil | |

(Continued)

FOREIGN PATENT DOCUMENTS

| JP | 2008/067037 | 3/2008 |
| WO | WO 2009/061618 | 5/2009 |
| WO | WO 2011/103582 | 8/2011 |

OTHER PUBLICATIONS

International Patent Application No. PCT/US2011/025744: International Search Report dated May 9, 2011, 2 pages.

(Continued)

*Primary Examiner* — Benjamin Layno
(74) *Attorney, Agent, or Firm* — Baker & Hostetler LLP

(57) ABSTRACT

A gaming table comprises a table top having a top and a bottom surface adapted to receive an exchangeable insert. For instance, the top surface is configured to receive gaming accessories and defines an exchangeable insert bed. A base is connected to and configured to support the table top. A table top exchangeable insert is configured to be located within the exchangeable insert bed, wherein the insert includes a securing structure, for releasably securing the table top exchangeable insert to the table top to provide the ability to conveniently change the insert as desired.

21 Claims, 7 Drawing Sheets

(56) References Cited

U.S. PATENT DOCUMENTS

| | | |
|---|---|---|
| 7,874,923 B2 | 1/2011 | Mattice et al. |
| 8,480,091 B1 * | 7/2013 | Florence .................. 273/309 |
| 8,528,909 B2 * | 9/2013 | Gelinotte et al. ............ 273/309 |
| 2004/0160005 A1 * | 8/2004 | Krise et al. ................. 273/274 |
| 2004/0185938 A1 | 9/2004 | Moore et al. |
| 2005/0096137 A1 | 5/2005 | Seelig et al. |
| 2005/0236771 A1 * | 10/2005 | Soltys et al. ................ 273/274 |
| 2007/0194931 A1 | 8/2007 | Miller et al. |
| 2008/0150234 A1 * | 6/2008 | Makieil ...................... 273/309 |
| 2008/0180250 A1 | 7/2008 | Steil |
| 2009/0075723 A1 | 3/2009 | Richard et al. |
| 2009/0131151 A1 | 5/2009 | Harris et al. |
| 2009/0191933 A1 | 7/2009 | French |
| 2011/0089634 A1 | 4/2011 | Thorson et al. |

OTHER PUBLICATIONS

European Patent Application No. 11745444.7: Extended European Search Report dated Jan. 31, 2014, 8 pages.

* cited by examiner

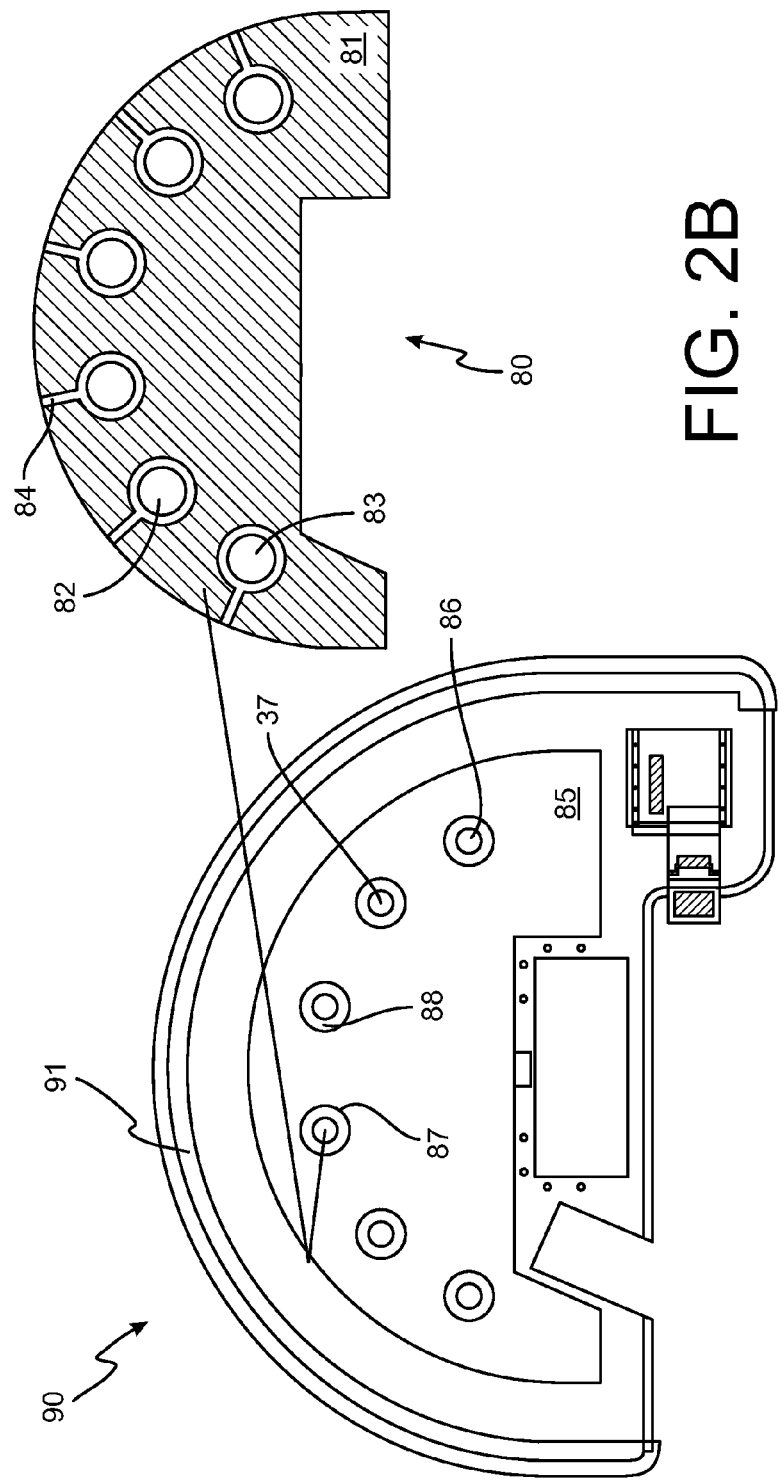

GAMING TABLES HAVING A TABLE TOP EXCHANGEABLE INSERT

CROSS REFERENCE TO RELATED APPLICATION

This application is a continuation-in-part of U.S. patent application Ser. No. 13/032,211 entitled "Gaming Table Protecting Antennas from Electromagnetic Interferences," filed Feb. 22, 2011, and incorporated herein by reference in its entirety.

This application is also related to U.S. Pat. No. 6,210,267, entitled "Apparatus and Method for Use of an Air Rail," issued Apr. 3, 2001, also incorporated herein by reference in its entirety.

FIELD OF THE DISCLOSURE

The present description relates generally to gaming tables, and more particularly to gaming tables having a table top exchangeable insert.

BACKGROUND OF RELATED ART

As compared to slot or video type games, traditional table games oftentimes offer greater excitement for some players, group play, and often attract big money players, which can result in larger profit margins for the casino. In a table game environment, however, it is often difficult to track how much money a player wagers, and thus it is likewise difficult to accurately provide complimentary gifts or reward good customers to encourage a return to a particular property. Prior gaming tables use gaming tokens or chips embedded with RFID to track a player's betting for this purpose.

These prior gaming tables with RFID gaming chips are pervasively used in casino and gaming rooms for table games such as blackjack, poker, baccarat, craps and roulette. Particularly, these tables are provided with a RFID system including at least one RFID antenna for tracking and reading the gaming chips used during the play of a table game. These gaming tables further include low frequency and high frequency RFID chips, low and high frequency RFID readers, table layouts, playing cards, dice, gaming furniture, roulette wheels, table accessories, and other products that are used for casino table games.

As described in related U.S. patent application Ser. No. 13/032,211, even with these prior art bet tracking techniques, numerous wagering aspects may be missed or unmonitored, as discussed below. With the growing use of electronic technology for chip verification and tracking, on-table shufflers and bill validators, today's gaming tables require more electronic equipment, devices, and wirings to be installed in them. As such, these electrical devices and wirings may interfere with the RFID antenna, causing malfunctions in the RFID tracking system. Further, the electrical devices and wirings emit heat inside the base of the table, such that the performance of the electronic equipment and RF signals and receivers can be affected.

Accordingly, one drawback to these prior art systems is that existing RFID-type systems may not be able to accurately track every token due to interference caused by electronic equipment and wirings, particularly when numerous tokens are stacked. In addition, these prior art systems may suffer from inter-antenna interferences if RFID antennas are spaced too closely together for games that have multiple and independent betting options per player seat, such as, for example, the game of baccarat. As a result, table layouts require sufficient spacing between antennas, which in turn may prevent use of a desired felt layout or prevent offering of the desired game.

Still further, there is a recognized need in the gaming industry to provide a gaming customer with ever-changing gaming experience in order for the gaming operator to remain current, provide a variety of gaming options, etc. This may include new games, new game and table layouts, special gaming events, tournaments, VIP tables, or the like. Any disruption in gaming operations, however, can be cause for concern as gaming operators are oftentimes hesitant to bring gaming tables off-line, and when doing so typically requires compliance with gaming regulation standards. For instance, there is a continued need in the gaming industry to provide, for example, multiple table games which can be played alternately at a specially constructed gaming table known as a "multi-game table" while remaining gaming regulation compliant.

Thus, there is a need for a gaming table designed and built to accommodate the electronic and/or mechanical equipment that is increasingly provided on gaming tables, and yet provide the operator the ability to conveniently provide a new and/or changed gaming experience with little or no disruption to gaming operations as desired. As such, the tables described herein may ultimately provide for a gaming table configured to allow for a secured, minimally disruptive, quick-change of the table top, and yet still provide for ventilation and cooling of electronic equipment, elimination of any degradation in performance of the RF signals and electronic equipment, and still allow for specially-built areas for a shuffler and a bill validator that are ergonomically placed for dealer convenience and comfort while preventing any possible cheating.

BRIEF DESCRIPTION OF THE DRAWINGS

These and other features, aspects and advantages of the present disclosure will become better understood with regard to the following description, appended claims, and accompanying drawings.

FIG. 2B shows a plan view of an alternate example of a table top having an exchangeable insert bed for receiving a table top insert thereon.

DETAILED DESCRIPTION

The following descriptions of various examples are not intended to limit the scope of the descriptions to the precise form or forms detailed herein. Instead the following descriptions are intended to be illustrative so that others may follow their teachings.

In the present disclosure, the term "gaming accessory" can mean any type of gaming chip, gaming token, playing card, die, gaming plaque, gaming disk, gaming plate, or any other suitable gaming accessory. Still further, it will be appreciated that any suitable data storage and/or data transmission device (contactless or otherwise), such as for example, a radio-frequency identification (RFID), near field communication (NFC), etc. gaming chip can be embedded in any of these accessories, such that the gaming accessories can be detected, read, written to, and/or tracked by any suitable sensor, detector, reader, transceiver, antenna, etc.

Figure 1:
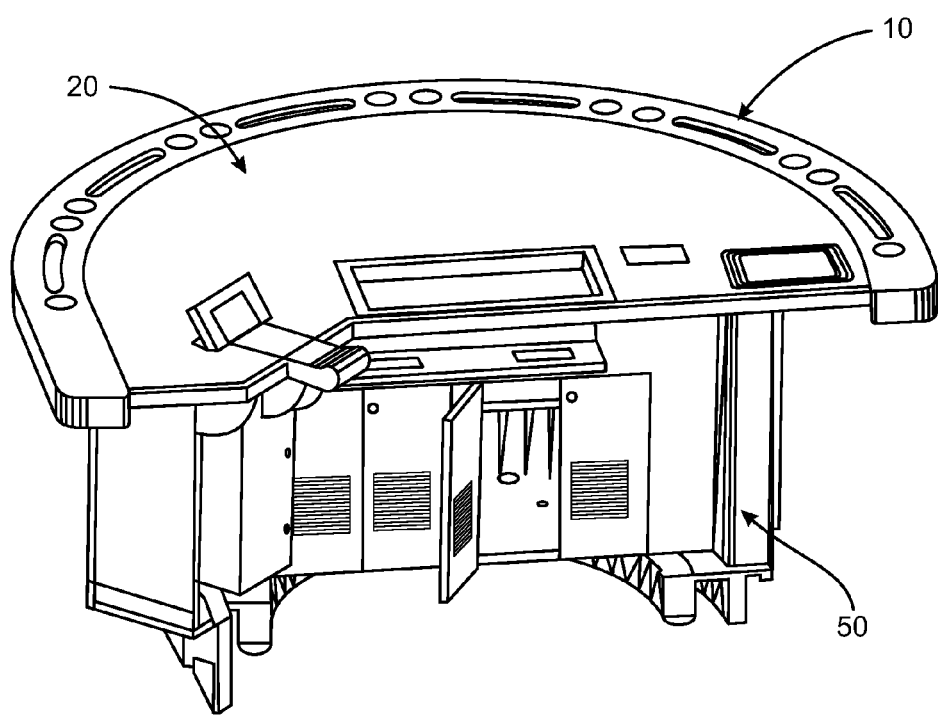
FIG. 1 shows a perspective view of a gaming table in accordance with one or more examples of the present disclosure.

As shown in FIG. 1, a sample gaming table 10 in accordance with one or more examples of the present disclosure is shown. In the illustrated example, the gaming table 10 comprises a table top 20 and a base 50 connected thereto, wherein the base 50 is sufficiently configured so as to support the table top 20. The example base 50 includes a general barrel-like configuration, and the example table top 20 includes a generally semicircular shape, such that table game players may be positioned around the table top 20 and within reach of a dealer. It will be appreciated, however, that other shapes of the gaming table 10, and more particularly the table top 20 and the base 50, are possible, such as an oval, a circle, a square, a rectangle and the like. Still further, it will be understood by one of ordinary skill in the art that the gaming table 10 may be constructed with any suitable base configuration including an open base and/or a closed barrel base, such as one that has a stretcher bar that ties two legs together. In any instance, the base 50 may be configured to store accessories, sensors, computer hardware, etc.

Figure 2A:
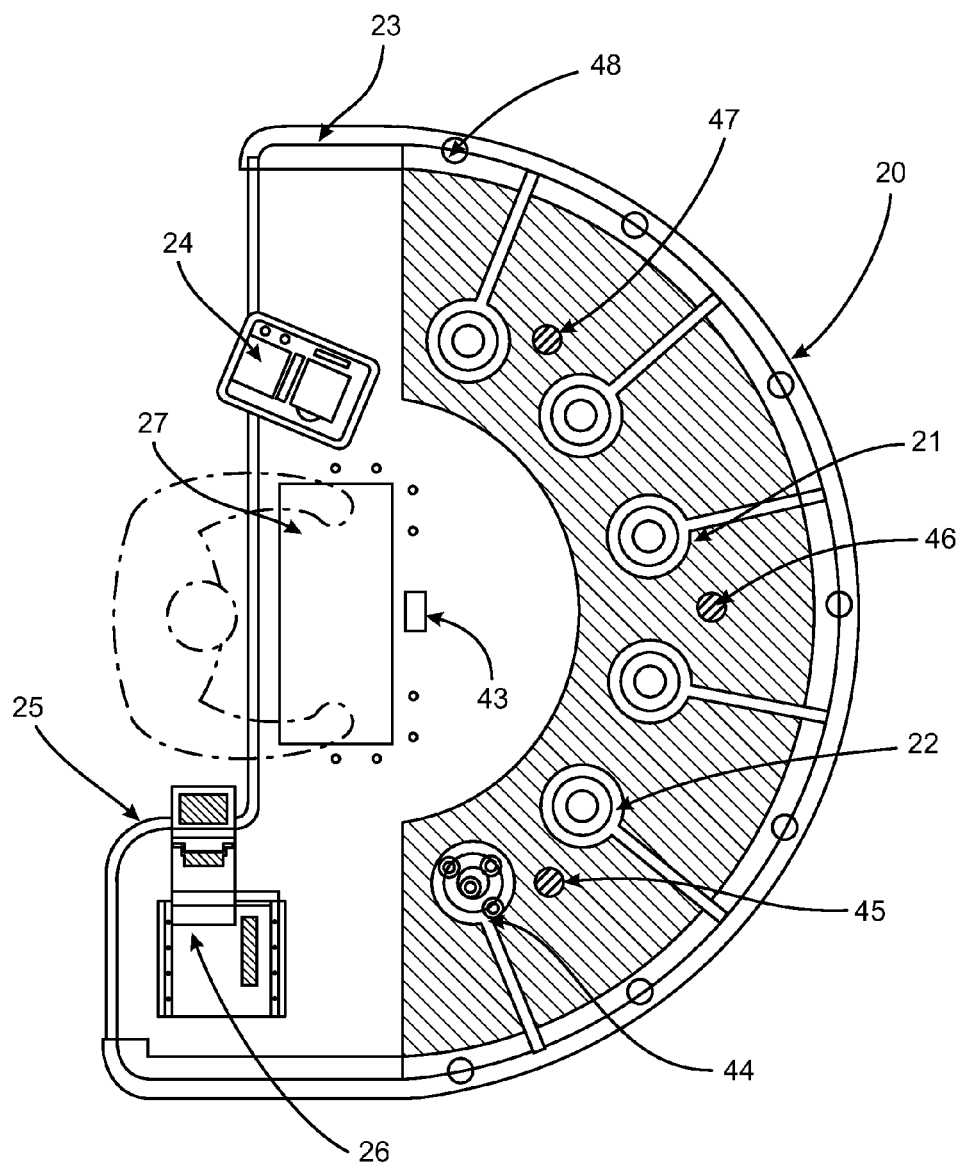
FIG. 2A shows a plan view of a gaming table in accordance with one or more examples of the present disclosure, illustrating a layout of the table top.
Figure 2C:
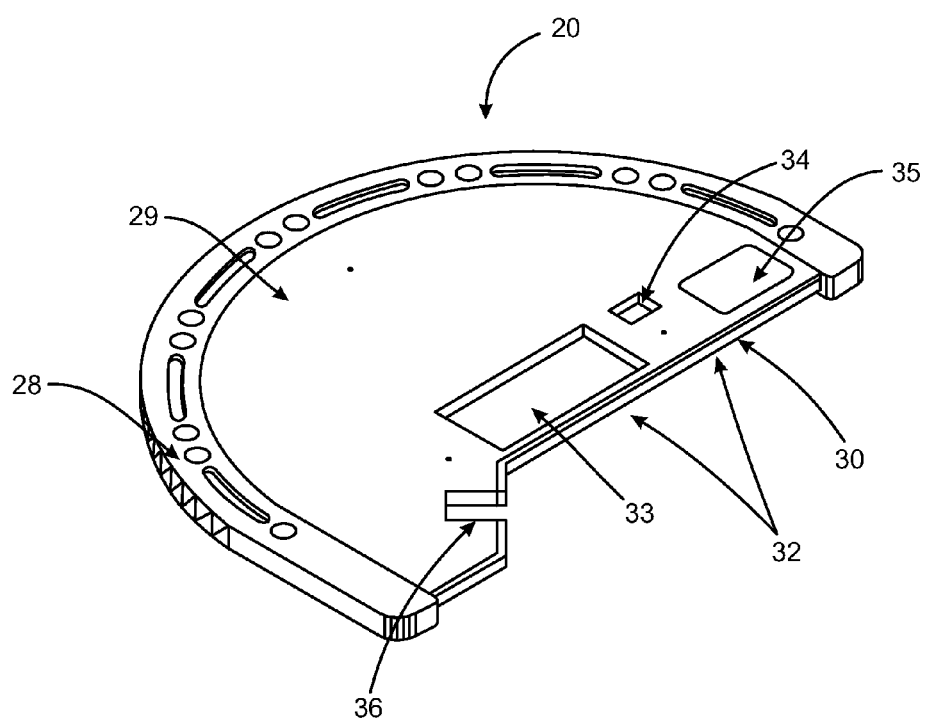
FIG. 2C shows a perspective view of a table top in accordance with one or more examples of the present disclosure, illustrating a different layout from that of the table top shown in FIG. 2A.
Figure 3:
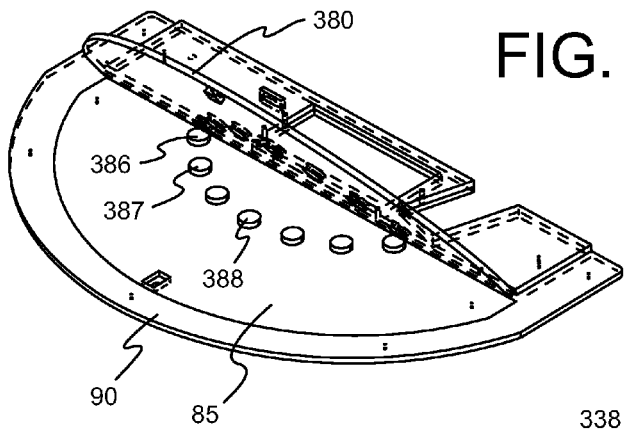
FIG. 3 shows a perspective view of a table top in accordance with one or more examples of the present disclosure, illustrating another example table top insert.
Figure 4:
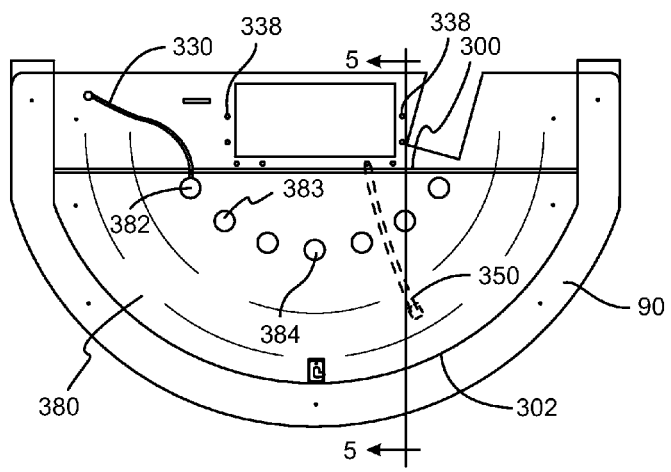
FIG. 4 shows a top plan view of the table top of FIG. 3.
Figure 5:
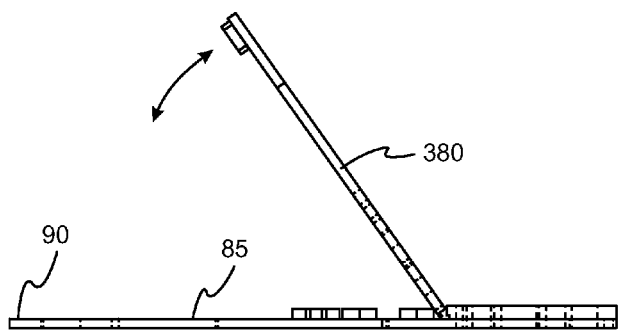
FIG. 5 shows a cross sectional side view of the table top of FIG. 3, taken along the lines 5-5 of FIG. 4.
Figure 6:
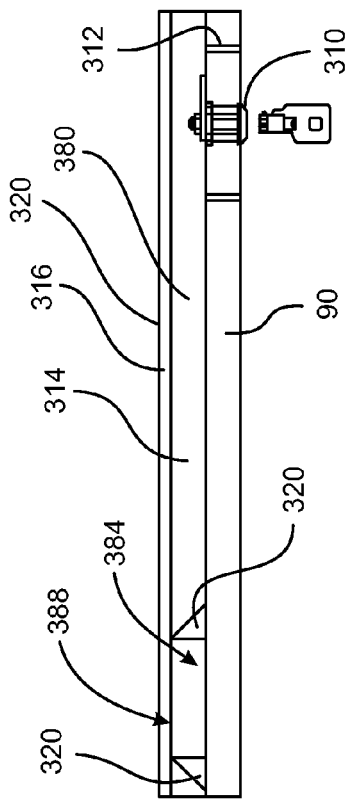
FIG. 6 shows an enlarged cross sectional view of the table top of FIG. 3, showing an example air rail.
Figure 7:
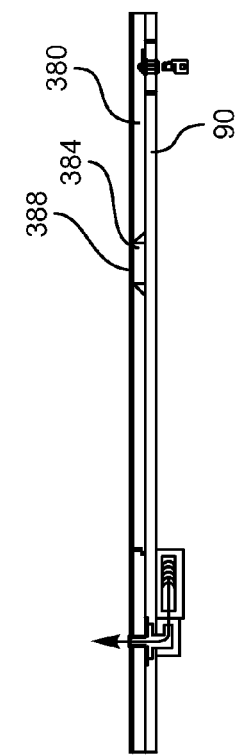
FIG. 7 shows an enlarged cross sectional view of the table top of FIG. 3, showing a chamfered aperture and a locking device.

As shown in FIGS. 2A, 2B and 2C, the example top surface of table top 20 may be configured to receive any suitable gaming accessory 44 such as, for example, a gaming chip, a plaque, a playing card, a die, a disk, etc. In the illustrated example, the table top 20 may include a sensor and/or detector such as an RFID antenna 22 configured to operate to detect, read from, write to, and/or track any of the gaming accessories. While in the present application, the sensors are described with relation to an RFID system, it will be appreciated that the configuration and/or type of sensor may vary as desired. For example, the sensor may be any suitable sensor, including for instance, a "presence sensor" such as an optical sensor, light sensor, weight sensor, etc. Still further, the sensors may be passive and/or may be active as desired. Additionally, the sensors described herein may be embedded and/or attached to any suitable surface for achieving the desired gaming sensing. More particularly, the example RFID antenna 22 is illustrated as being mounted to the table top 20, but may be mounted to any suitable portion of the gaming table 10, such as a table insert as will be described herein.

The example RFID antenna 22 may be configured to perform any combination of the listed functions. As shown in FIG. 2A, as an illustration, the example table top 20 is shown to have, but is not limited to, six antennas, such that six people may play a table game at the same time. As noted, one of ordinary skill in the art will appreciate that, if provided, any number and combination of antennas, sensors, detectors, etc., in any suitable size, shape, location, etc., may be positioned within the table top 20 and/or other location on the gaming table 10 and still fall within the scope and spirit of the present disclosure.

The example gaming table 10 may have power cables, such as AC (alternating current) cables and may also have power supplies (e.g., transformers, etc.) to power computers, displays, sensors, detectors, RFID readers, shuffling machines, bill acceptors, validators, etc., or any components that require power. Piping may be added to secure, shield, or protect any of the provide cables, data cables, antenna, etc., to keep them separated and/or protected from each other and from equipment in the table. The piping may be insulated, or may be painted or coated with a pre-formulated paint or coating for better efficiency in preventing electromagnetic and harmonic disturbances caused by the cables to interfere with the various sensors.

As illustrated in FIG. 2A, the example table top 20 includes a cup shield 21 that shields a sensor such as the RFID antenna 22 from any potential electromagnetic and/or harmonic disturbances caused by any cables or the like. In this particular configuration, the example RFID antenna 22 is located within range of certain disturbances but is shielded by the cup shield 21 so that the antenna 22 is not detuned or looped. The gaming table 10 may also include different kinds of electrical equipment, devices, and/or wirings that may interfere with the proper function of RFID antenna 22. In particular, the table may include a plurality of electrical wires 45, 46 and 47 located within or near the table top 20, or within or near the base 50. For example, the gaming table 10 may include an AC wiring 45 and an RFID wiring 46 for an RFID system. The RFID system is not limited to just the RFID wiring 46, but may also include the RFID antenna 22, and data wiring 47 for a Universal Serial Bus (USB) and other equipment for data transmission and communications.

As is well known, electrical equipment and wirings are capable of generating electromagnetic or harmonic interferences with any of the sensors, including the RFID antenna 22, such that the RFID antenna 22 may incorrectly read RFID gaming chips, RFID playing cards or other accessories. As such, a cup shield 21 may be provided to shield and protect the RFID antenna 22 from electromagnetic interference (EMI) caused by the electrical equipment, devices and wirings located in the base 50. The example cup shield 21 is configured to protect the RFID antenna 22 against radio frequency interference (RFI), such as AC harmonic radiation, or any other interference source. Furthermore, in one particular example, the example cup shield 21 prevents the antenna from being read under the table, so as to discourage counterfeiting during a game. The cup shield 21 also may be configured to protect the RFID antenna 22 from being detuned, as further discussed below.

In the illustrated example, the gaming table 10 includes a bill validator 26 located on the table top 20 and within reach of the dealer. As shown, the bill validator 26 is installed in both the base 50 and the table top 20. The bill validator 26 may be installed within a cage and constructed of any appropriate material, e.g., plywood and aluminum, on the right or left side of the dealer as desired. The table top 20 may include an RFID float tray 27 configured to store the gaming accessories 44. In the illustrated example, the RFID float tray 27 is located on the top surface of table top 20 and within reach of the dealer, however, any configuration of the RFID float tray may be used without departing from the scope and spirit of the present disclosure.

The example table top 20 also includes a card shuffler 24 located on the table top 20 and within reach of the dealer. The example card shuffler 24 is typically installed in the base 50 and the table top 20. The card shuffler 24 may be located on the right or left side of the dealer. Furthermore, the table top 20 may include an LCD display 43 located within sight of the dealer such as in front of, on the right side or on the left side of the dealer's position.

As shown in FIG. 2C, the example table top 20 includes a top base 28 assembled with a top insert 29 and a strip 30 placed on a dealer side. An inlay 23 is attached to the top base 28. The inlay 23 includes rail drink openings with cup holders 48 and a dealer bar 25 attached to the strip 30. In this example, the top base 28 and the top insert 29 both may be assembled together in any appropriate fashion, e.g., by using screws (not shown) or other fastening means. On the dealer side, the strip 30 may be fastened in any practical manner, e.g., with metallic inserts 32 or the like. In additional, the example top insert 29 may have any one of the following: a cutout 33 for receiving the RFID float tray 27, a cutout 36 for receiving the bill validator 26, a cutout 34 for a LCD module including the LCD monitor 43, or a cutout 35 for an antenna configured for testing, reading, writing to or tracking the gaming accessories 44.

In one particular example, the top insert 29 is coated or painted with a pre-formulated coating or paint to limit the reading field produced by the RFID antenna 22. As will be appreciated, this specially pre-formulated coating or paint may also be applied to the interior of cup shield 21. In such a configuration, the coating or paint prevents antenna from being read under the table so as to prevent cheating, prevents the antenna 22 from being detuned, and protects the RFID system from radio frequency interference and electromagnetic interference.

FIG. 2A shows an example cross hatched portion identifying the top insert 29 painted with the pre-formulated paint. In one example, the pre-formulated coating or paint is a water-based, conductive paint, with a copper composition. In another example, the pre-formulated coating or paint comprises a water-based shielding material that is interspersed with copper and/or ferrite particles. The density and viscosity of the pre-formulated paint may be defined in an advantageous way such that the paint may be easily applied on wood and plastic materials to prevent detuning the antennas. Typically, the paint may be applied in all areas around the antennas without creating a closed loop.

For the manufacture of the inlay 23, any appropriate material may be used, such as for example, wood, plastic, composites, etc. In one example, the width of the inlay 23 is 1¼" wide. The example inlay 23 may be assembled with several components of rail drink openings cut and prepared by using any suitable manufacturing process, including a computer numerical control (CNC) machine. In this instance, after the inlay 23 is assembled, it is returned to the CNC machine for a final radial cut, and then it may be sent to a sanding and staining area to apply a layer of clear polyester as desired, e.g., Duratek 904-045, combined with an organic liquid hardener, e.g., Superox Peroxide type "D," each day for 6 days. Between each paint application to the inlay 23, the hardwood may be sanded with sandpaper, e.g., #220. The inlay 23 having the rail drink openings may then be secured to the table top with appropriate fasteners, e.g., 1¼" screws.

Meanwhile, the example dealer bar 25 may be made of oak, mahogany, or other suitable material with suitable dimensions, such as, for example, ¾"×1½". In this example, the same finish process as discussed above for the inlay 23 may be repeated for making the dealer bar 25. The dealer bar 25 may be secured to the table top 20 using appropriate fasteners, e.g., seven 1½"×¼" flat head bolts with shiny metallic finish. Other dimensions and ways of securing together the components of the gaming table are possible.

The gaming table 10 may include another antenna (not shown) for the RFID float tray 27, such that this antenna may be located under the RFID float tray 27.

FIG. 2B illustrates an example of a table top 90 having a two-piece construction comprising a top base 91 having an exchangeable insert bed 85 for receiving a table top exchangeable insert 80. Similar to the top inset of table top 20 illustrated and described with respect to FIG. 2A, exchangeable insert 80 is coated with a pre-formulated shielding coating or paint 81 to limit the reading field produced by the plurality of RFID antennas located on the RFID antenna beds 86, 87, 88, 89 in the table top 90. FIG. 2B shows the cross-hatched portion 81 identifying the pre-formulated paint. In one example of the exchangeable insert 80, the pre-formulated coating or paint is a water-based, conductive paint, with a copper composition. In another example, the pre-formulated coating or paint comprises a water-based shielding material that is interspersed with copper and/or ferrite particles.

In the particular illustrated example of FIG. 2B, the exchangeable insert bed 85 is a recessed area on the surface of the top base 91 of table top 90 and is configured to receive the table top exchangeable insert 80 within its interior. The example insert bed 85 may be any recess, cutout, flange, support, etc. that is adapted to receive and support the insert 80 relative to the table top 90. The insert bed 85 may be configured to completely and/or partially support the bottom surface of the insert 80 once installed in the bed. For instance, the bed 85 may be a flange, a ledge, a cross-support, a portion of the base, etc. In operation, the example table top exchangeable insert 80 is placed on the top surface of table top 90 within the interior of the exchangeable insert bed 85. In this example, a plurality of hollow circle members 82, 83, 84 are arranged in table top exchangeable insert 80 to accommodate the plurality of RFID antenna beds 86, 87, 88, 89 in the table top 90, and more particularly in the bed 85. Typically, the depth of the exchangeable insert bed 85 matches the thickness of the table top exchangeable insert 80. In other words, the insert bed 85 supports the table top exchangeable insert 80 such that the top surface of the table top 90 and the top surface of the insert 80 are substantially coplanar.

As illustrated, in one example, the diameter of the plurality of hollow circle members 82, 83, 84 are sized to fit the diameter of the plurality of RFID antenna beds 86, 87, 88, 89 within the interior of the hollow circle members. The thickness of the table top exchangeable insert 80 is sized so that the surface of exchangeable insert 80 is coplanar with the surface of the RFID antenna beds 86, 87, 88, 89. While, the thickness of the example table top exchangeable insert 80 is ¾", it will be appreciated by one of ordinary skill in the art that any suitable thickness may be used for the table top exchangeable insert 80 as desired.

FIGS. 3-9 illustrate another example of a table top exchangeable insert 380 for use with the example table top 90, or any suitable table top. Similar to the previous example, in the illustrated example, the insert 380 is generally a semicircular insert having a plurality of apertures 382, 383, 384, arranged in the table top exchangeable insert 380 to accommodate a plurality of sensors, such as, for example a plurality of RFID antenna beds 386, 387, 388 supported on the table top 90. In this example, each of the apertures and sensors is circular in shape, but may vary in size, location, and/or shape as desired.

Specifically, in this example, the insert 380 includes a generally collinear portion 300 and a generally arcuate portion 302. At least a portion of a perimeter of the collinear portion 300 defines a securing structure, such as a tongue 304 that engageably mates with a corresponding structure, such as a notch or groove 306 formed in the table top 90. As will be understood, the securing structure may be any suitable securing structure mounted and/or formed on either or both of the insert 380 and the table top 90. For instance, the securing structure can be any removable mechanical and/or chemical device including, a pivot, a latch, a hook-and-loop, a releasable adhesive, or any other suitable securing means.

The example insert 380 also includes an optional locking device, such as a lock 310 extending from a bottom side of the insert 380 and adapted to be received by the table top 90, e.g., though an aperture 312 defined by the supporting surface of the table top 90. In the illustrated example, the lock 310 comprises a keyed, cam lock that allows for the securement of the insert 380 within the table top 90, although any suitable mechanism, including for instance a latch, may be utilized. To provide an adequate playing surface, the example insert 380 also includes a base portion 314 covered by any desired playing surface such as a pad 316 underlay and a playing felt 320 outer layer.

Figure 8:
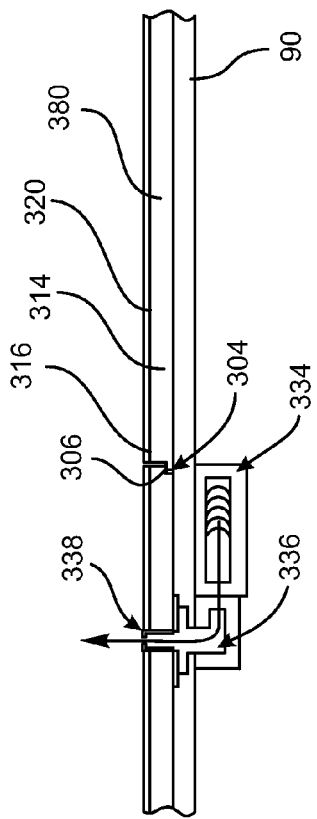
FIG. 8 shows side view of the table top of FIG. 3, showing the table top insert partially removed from the table top.
Figure 9:
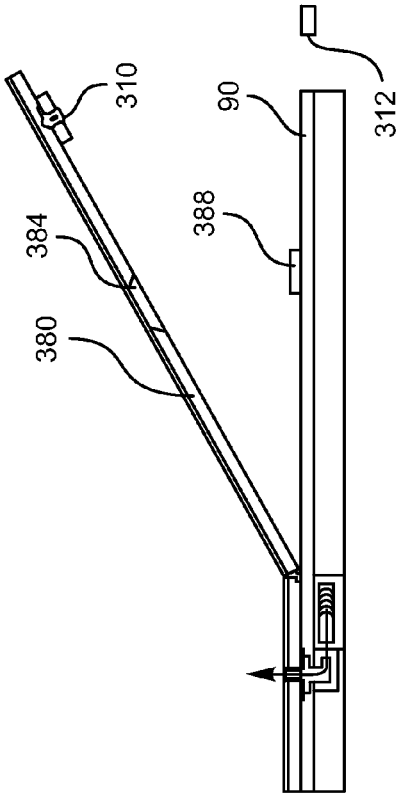
FIG. 9 shows the table top of FIG. 8, showing the table top insert mounted within the table top.

In operation, the example insert 380 may be removably inserted into the interior of the exchangeable insert bed 85 by first engaging the tongue 304 with the groove 306 as shown in FIG. 8. Once engaged, the insert 380 may be rotated downward toward the insert bed 85 and secured in position with the lock 310. Together, the lock and the securing structure combine to secure the insert 380 in the bed 85 such that the insert 380 cannot be easily removed by unauthorized persons thereby preventing access to and tampering with RFID sensors, wirings, etc. While the lock 310 is illustrated as being mounted to the insert 380, it will be appreciated that the lock 310 may be mounted to any of the insert 380 and/or the table top 90 as desired. To remove the insert 380, the lock 310 must first be disengaged, and the insert rotated away from the table top 90 sufficiently to allow the disengagement of the tongue 20 from the groove 306. It will be appreciated by one of ordinary skill in the art that the method and/or steps of securing and/or removing the insert 380 from the bed 80 may be changed and/or altered as desired.

Still further, in this example, because the table top 90 includes a plurality of sensors 386, 387, 388, and because the example insert 380 is rotated into position within the bed 85, each of the apertures includes a chamfered portion 320 to allow the sensor to pass through the aperture without contact (e.g., to avoid damage). As such, the sensor is able to extend at least partially though the base 314 of the insert 380 and into close proximity with the playing surface of the insert 380, thereby increasing the effective range and reliability of the sensor.

It will be additionally noted that as previously described, the illustrated table top 90 includes additional gaming accessories including at least one conduit wire 330 and an air rail system 332 in accordance with known gaming table construction. For instance, the conduit wire may be a power supply, network cable, etc. Meanwhile, the example air rail system 332, may be similar to the air rail system described in U.S. Pat. No. 6,210,267, hereby incorporated by reference in its entirety, and including a fan 334 and air chamber 336, and at least on air nozzle 338 to produce an airflow from an upper surface of the table top 90.

To ensure compatibility, the insert 380 may be constructed to interface with, support, and/or accommodate any and/or all of the gaming accessories, connectors, and/or sensors supported within the gaming table 10. In particular, the insert 380 may include an internal conduit and electrical connector system (not shown) (e.g., a plug-to-interface connector) to provide an electrical interface with and electrically couple with the conduit 330, or any other electrical connection as desired. In this manner, any electronics mounted in and/or on the insert 380 (e.g., lights, sensors, electronic devices, signage, etc.) may be attached to and coupled with the corresponding electronic system in the table top 90.

As way of another example, the insert 380 may also include at least one internal air chamber 350 formed in the base 314 and configured such that when mated with the table top 90, the air chamber 350 is coupled to the air chamber 336 of the air rail system 332 and to extend the air rail system 332 toward the outer edge of the gaming table 10. It will be appreciated that the air chamber 350 extended through the insert 380 may include any suitable means for directing the air through the insert 380, and more particularly through the playing surface as desired. For instance, the air chamber 350 may include a grommet and/or other suitable aperture defined through the playing surface, including a vent, etc. As will further be understood, the direction, temperature, speed, etc. of the airflow through the air chamber 350 may be controlled through any suitable electronic and/or mechanical means including adjustable apertures, valve, and/or variable flow fans, etc. In still other examples, the air chambers 30 may not include any additional aperture through the playing surface, and may simply direct the air to the playing surface with sufficient pressure to cause the airflow to at least partially penetrate the felt covered playing surface.

Figure 10:
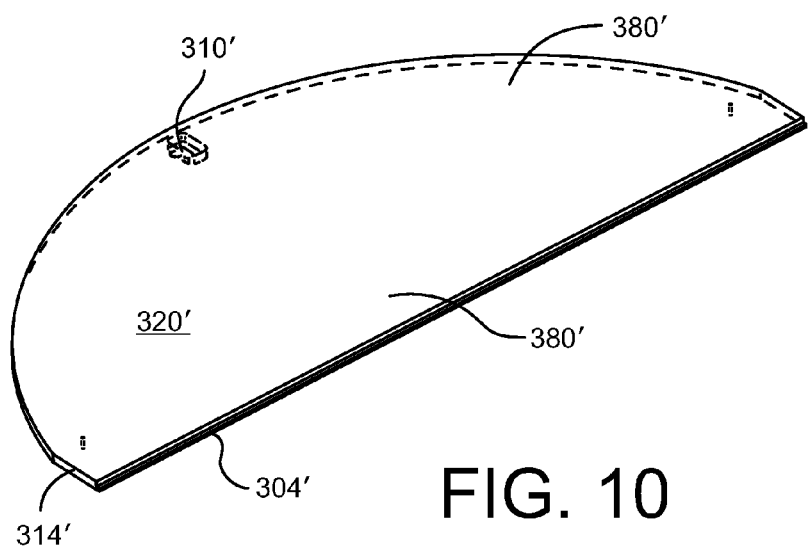
FIG. 10 shows a perspective view of another example table top insert.
Figure 11:
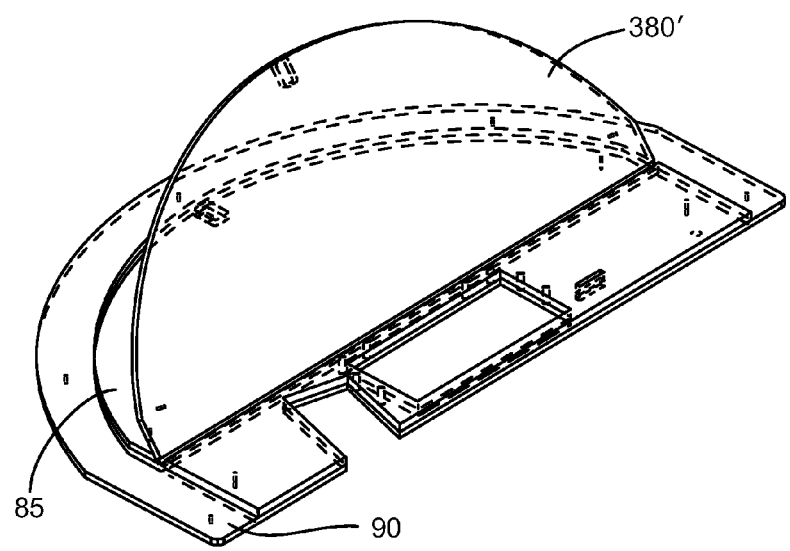
FIG. 11 shows a perspective view of the example table top insert of FIG. 10 partially removed from the table top.

Turning to the example of FIGS. 10 and 11, there is illustrated an example insert 380' that does not include any additional sensors, apertures, etc. Rather, in this illustration, the example insert 380' simply comprises a base 314', a playing surface 320' (e.g., a playing felt and a pad) a securing structure 304', and a lock 310'. As with the previous examples, the insert 380' may be removably secured to the table top 90 by first engaging the securing structure 304' with a corresponding structure in the table top 90, and rotating the insert 380' toward the insert bed 85. The insert 380' may be securely locked to the table top 90 with the lock 310' to prevent any tampering and/or removing of the insert 380' without proper authorization. To remove the insert 380', the process is once again reversed, with an unlocking of the lock 310', the rotation of the insert 380' away from the bed 85, and the disengagement of the securing structure 304' from the table top 90.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A gaming table comprising:
   a table top having a top and a bottom surface, the top surface being configured to receive gaming accessories, the top surface having a recess;
   a base connected to and configured to support the table top;
   a table top exchangeable insert configured to be supported within the recess, the table top exchangeable insert including a securing structure, for releasably securing the table top exchangeable insert to the table top; and
   at least one sensor located within the recess of the table top, supported by the table top and located at least partially beneath the table top exchangeable insert when the table top exchangeable insert is located within the recess, the sensor configured to communicate with at least one of the gaming accessories, wherein at least a portion of the table top exchangeable insert proximate the at least one sensor is painted with a pre-formulated paint, wherein the paint is adapted to at least one of protect the at least one sensor against electromagnetic or radiofrequency interferences, limit a reading field of the at least one sensor without closing a loop around the at least one sensor, or prevent detuning of the at least one sensor.

2. A gaming table as recited in claim 1, wherein the table top includes a corresponding securing structure for cooperating with the securing structure of the table top exchangeable insert to releasably secure the table top exchangeable insert to the table top.

3. A gaming table as recited in claim 2, wherein the securing structure of one of the table top exchangeable insert or the table top is a tongue and wherein the corresponding securing structure of the other one of the table top exchangeable insert or the table top is a groove.

4. A gaming table as recited in claim 1, further comprising a lock mounted on at least one of the table top or the table top exchangeable insert to lockably secure the table top exchangeable insert within the recess.

5. A gaming table as recited in claim 1, wherein the recess is defined by the top surface of the table top and includes at least one support within the recess to support the table top exchangeable insert within the recess.

6. A gaming table as recited in claim 5, wherein a top surface of the table top exchangeable insert is substantially coplanar with the top surface of the table top when the table top exchangeable insert is located within the recess.

7. A gaming table as recited in claim 6, wherein the depth of the recess is the same as a thickness of the table top exchangeable insert.

8. A gaming table as recited in claim 1, wherein the table top exchangeable insert defines an arcuate perimeter portion and a substantially collinear perimeter portion.

9. A gaming table as recited in claim 8, wherein the arcuate perimeter portion and the substantially collinear perimeter portion generally define a half circle.

10. A gaming table as recited in claim 1, wherein the recess is sized and positioned such that removal of the table top exchangeable insert from the recess does not necessitate removal of any of the gaming accessories received within the top surface of the table top.

11. A gaming table as recited in claim 1, wherein the table top exchangeable insert defines at least one aperture sized to correspond to the at least one sensor such that each of the at least one aperture is configured to fit over a corresponding at least one sensor located within the recess of the table top when the table top exchangeable insert is located within the recess.

12. A gaming table as recited in claim 11, wherein each of the at least one aperture comprises a chamfered portion to allow the sensor to pass at least partially through the corresponding aperture without contact.

13. A gaming table as recited in claim 1, wherein the table top exchangeable insert comprises a playing area.

14. A gaming table as recited in claim 13, wherein the playing area comprises an outer layer of playing felt and an underlay of padding.

15. A gaming table as recited in claim 13, wherein the playing area of the table top exchangeable insert comprises indicia specific to a game utilized in a gaming location, and wherein the table top is devoid of any indicia specific to the game.

16. A gaming table as recited in claim 15, wherein the an indicia of the table top exchangeable insert is aligned with a corresponding at least one sensor located within the top surface of the table top when the table top exchangeable insert is located within the recess.

17. A gaming table as recited in claim 1, wherein the sensor comprises an antenna.

18. A gaming table as recited in claim 1, wherein the table top exchangeable insert includes at least one air chamber.

19. A gaming table as recited in claim 18, wherein the air chamber of the table top exchangeable insert is configured to mate with an air chamber fluidly coupled to a fan when the table top exchangeable insert is located within the recess.

20. A gaming table as recited in claim 18, wherein the air chamber defines at least one aperture to produce an airflow from an upper surface of the table top exchangeable insert.

21. A gaming table as recited in claim 20, wherein the airflow through the defined at least one aperture is selectively modifiable.

\* \* \* \* \*